(12) United States Patent
Saiprasad et al.

(10) Patent No.: US 8,799,177 B1
(45) Date of Patent: Aug. 5, 2014

(54) METHOD AND APPARATUS FOR BUILDING SMALL BUSINESS GRAPH FROM ELECTRONIC BUSINESS DATA

(75) Inventors: Sundar Saiprasad, Bangalore (IN); Seegler Ittyavirath, Bangalore (IN)

(73) Assignee: Intuit Inc., Mountain View, CA (US)

( * ) Notice: Subject to any disclaimer, the term of this patent is extended or adjusted under 35 U.S.C. 154(b) by 588 days.

(21) Appl. No.: 12/845,951

(22) Filed: Jul. 29, 2010

(51) Int. Cl.
  *G06Q 10/00* (2012.01)
  *G06Q 50/00* (2012.01)
  *G06Q 10/06* (2012.01)

(52) U.S. Cl.
  CPC .............. *G06Q 50/01* (2013.01); *G06Q 10/063* (2013.01); *G06Q 10/067* (2013.01)
  USPC ........................... 705/319; 705/7.11; 705/348

(58) Field of Classification Search
  CPC ....................................................... G06Q 50/01
  See application file for complete search history.

(56) References Cited

U.S. PATENT DOCUMENTS

| | | | | |
|---|---|---|---|---|
| 5,978,581 | A * | 11/1999 | Sadiq et al. ..................... | 717/104 |
| 6,003,037 | A * | 12/1999 | Kassabgi et al. ....................... | 1/1 |
| 6,539,374 | B2 * | 3/2003 | Jung ...................................... | 1/1 |
| 6,795,830 | B1 * | 9/2004 | Banerjee et al. ....................... | 1/1 |
| 7,203,925 | B1 * | 4/2007 | Michael et al. ................ | 717/109 |
| 7,433,876 | B2 * | 10/2008 | Spivack et al. .......................... | 1/1 |
| 7,433,940 | B2 * | 10/2008 | Benfield et al. ................ | 709/221 |
| 7,536,686 | B2 * | 5/2009 | Tan et al. ....................... | 717/174 |
| 7,665,064 | B2 * | 2/2010 | Able et al. ..................... | 717/117 |
| 7,702,725 | B2 * | 4/2010 | Erickson et al. .............. | 709/203 |
| 7,730,216 | B1 * | 6/2010 | Issa et al. ...................... | 709/250 |
| 7,739,653 | B2 * | 6/2010 | Venolia ........................... | 717/101 |
| 7,743,360 | B2 * | 6/2010 | Venolia ........................... | 717/103 |
| 7,904,442 | B2 * | 3/2011 | Bahn ............................... | 707/708 |
| 7,921,124 | B1 * | 4/2011 | Bickerstaff ..................... | 707/754 |
| 7,921,191 | B2 * | 4/2011 | Benfield et al. ................ | 709/221 |
| 7,962,644 | B1 * | 6/2011 | Ezerzer et al. ................. | 709/238 |
| 8,095,432 | B1 * | 1/2012 | Berman et al. ................ | 705/26.7 |
| 8,185,558 | B1 * | 5/2012 | Narayanan et al. ............ | 707/798 |
| 2002/0073180 | A1 * | 6/2002 | Dewhurst et al. ............. | 709/220 |
| 2003/0014421 | A1 * | 1/2003 | Jung .............................. | 707/102 |
| 2003/0126151 | A1 * | 7/2003 | Jung .............................. | 707/100 |
| 2003/0187973 | A1 * | 10/2003 | Wesley .......................... | 709/224 |
| 2003/0208499 | A1 * | 11/2003 | Bigwood et al. .............. | 707/100 |
| 2004/0225390 | A1 * | 11/2004 | Keller et al. ..................... | 700/95 |
| 2005/0027871 | A1 * | 2/2005 | Bradley et al. ................ | 709/227 |
| 2005/0086384 | A1 * | 4/2005 | Ernst ............................. | 709/248 |
| 2005/0124320 | A1 * | 6/2005 | Ernst et al. .................... | 455/411 |
| 2005/0160164 | A1 * | 7/2005 | Benfield et al. ............... | 709/223 |
| 2005/0182752 | A1 * | 8/2005 | Rojer ................................ | 707/2 |

(Continued)

*Primary Examiner* — Brett Feeney
(74) *Attorney, Agent, or Firm* — Park, Vaughan, Fleming & Dowler LLP

(57) ABSTRACT

Embodiments of the present invention provide a method, a computer-readable storage medium, and an apparatus for building a small business social graph. During operation, the system receives a collection of data from a first business. Next, the system determines if a first node for the first business exists in a social graph, wherein the social graph is a graph-based data model that indicates relationships among various businesses. If not, the system adds the first node for the first business to the social graph. The system then analyzes the collection of data to identify a second business. Next, the system determines if a second node for the second business exists in the social graph. If not, the system adds the second node for the second business to the social graph. Finally, the system adds a relationship between the first node and the second node to the social graph to indicate the relationship between the first business and the second business.

16 Claims, 3 Drawing Sheets

(56) References Cited

U.S. PATENT DOCUMENTS

| | | | |
|---|---|---|---|
| 2005/0223109 A1* | 10/2005 | Mamou et al. | 709/232 |
| 2006/0004703 A1* | 1/2006 | Spivack et al. | 707/2 |
| 2006/0041661 A1* | 2/2006 | Erikson et al. | 709/225 |
| 2006/0143067 A1* | 6/2006 | Calabria | 705/10 |
| 2006/0165040 A1* | 7/2006 | Rathod et al. | 370/335 |
| 2006/0195332 A1* | 8/2006 | Bogner et al. | 705/1 |
| 2006/0195463 A1* | 8/2006 | Bogner et al. | 707/101 |
| 2006/0271304 A1* | 11/2006 | He et al. | 702/19 |
| 2007/0011659 A1* | 1/2007 | Venolia | 717/127 |
| 2007/0050762 A1* | 3/2007 | Chen et al. | 717/169 |
| 2007/0061487 A1* | 3/2007 | Moore et al. | 709/246 |
| 2007/0100768 A1* | 5/2007 | Boccon-Gibod et al. | 705/59 |
| 2008/0104032 A1* | 5/2008 | Sarkar | 707/3 |
| 2008/0222581 A1* | 9/2008 | Banerjee et al. | 716/4 |
| 2008/0243908 A1* | 10/2008 | Aasman et al. | 707/102 |
| 2008/0306959 A1* | 12/2008 | Spivack et al. | 707/9 |
| 2008/0313219 A1* | 12/2008 | Benfield et al. | 707/102 |
| 2009/0043798 A1* | 2/2009 | Tan et al. | 707/102 |
| 2009/0112807 A1* | 4/2009 | Bahn | 707/3 |
| 2009/0234815 A1* | 9/2009 | Boerries et al. | 707/3 |
| 2009/0259652 A1* | 10/2009 | Yamane et al. | 707/5 |
| 2010/0030734 A1* | 2/2010 | Chunilal | 707/3 |
| 2010/0082695 A1* | 4/2010 | Hardt | 707/798 |
| 2010/0153862 A1* | 6/2010 | Schreiber | 715/760 |
| 2010/0169134 A1* | 7/2010 | Cheng et al. | 705/7 |
| 2010/0228476 A1* | 9/2010 | Bar-Zeev et al. | 701/209 |
| 2010/0233996 A1* | 9/2010 | Herz et al. | 455/411 |
| 2010/0241644 A1* | 9/2010 | Jackson et al. | 707/760 |
| 2010/0262550 A1* | 10/2010 | Burritt et al. | 705/319 |
| 2010/0274815 A1* | 10/2010 | Vanasco | 707/798 |
| 2010/0318613 A1* | 12/2010 | Souza et al. | 709/206 |
| 2011/0035329 A1* | 2/2011 | Delli Santi et al. | 705/347 |
| 2011/0078583 A1* | 3/2011 | Chunilal | 715/747 |
| 2011/0161912 A1* | 6/2011 | Eteminan et al. | 717/101 |
| 2011/0173156 A1* | 7/2011 | Ou et al. | 707/634 |
| 2011/0213860 A1* | 9/2011 | Ezerzer et al. | 709/218 |
| 2011/0231363 A1* | 9/2011 | Rathod | 707/609 |
| 2011/0283205 A1* | 11/2011 | Nie et al. | 715/763 |

* cited by examiner

METHOD AND APPARATUS FOR BUILDING SMALL BUSINESS GRAPH FROM ELECTRONIC BUSINESS DATA

BACKGROUND

Related Art

For decades, people have been confronted with the problem of determining who they should contact when they need to purchase goods or services with which they are unfamiliar. Traditionally, people have chosen businesses at random from the phone book or from business directories. However, this can cause problems because the directory listings typically do not convey information about reliability, product quality, timeliness, or other business metrics.

In order to alleviate this problem, organizations such as the Better Business Bureau have formed to collect information and customer complaints to help consumers avoid problematic businesses. However, these organizations are typically local organizations that have very little comprehensive information about the vast number of consumer transactions in their respective areas. Furthermore, unless consumers know about the existence of these organizations and desire to use their services, these organizations are unlikely to gather a meaningful sample to evaluate most businesses.

In recent years, a number of online services have been developed to help consumers rate businesses. However, these services are also fraught with problems. For instance, with many services, businesses can pay the service to increase their rating. Additionally, businesses can have their employees provide feedback to the services to artificially increase their rating.

SUMMARY

One embodiment of the present invention provides a system for building a small business social graph. During operation, the system receives a collection of data from a first business. Next, the system determines if a first node for the first business exists in a social graph, wherein the social graph is a graph-based data model that indicates relationships among various businesses. If not, the system adds the first node for the first business to the social graph. The system then analyzes the collection of data to identify a second business. Next, the system determines if a second node for the second business exists in the social graph. If not, the system adds the second node for the second business to the social graph. Finally, the system adds a relationship between the first node and the second node to the social graph to indicate the relationship between the first business and the second business.

In some embodiments of the present invention, adding a node to the social graph involves adding metadata describing the node to the social graph.

In some embodiments of the present invention, adding a node to the social graph involves adding at least one unique identifier to the node.

In some embodiments of the present invention, the unique identifier may include at least one of a phone number, an email address, a street address, a contractor license number, a tax identification number, a Social Security number, or an account number.

In some embodiments of the present invention, the social graph adheres to at least one of a set of Semantic Web technologies.

In some embodiments of the present invention, the Semantic Web technologies can include: Resource Description Framework (RDF); Resource Description Framework Schema (RDFS); Web Ontology Language (OWL); and Friend of a Friend (FOAF).

In some embodiments of the present invention, the system receives a request to query the social graph from the first business, wherein the query includes an item of metadata. Next, the system queries the social graph with the item of metadata in response to the request. Finally, the system returns the results of the query to the first business.

In some embodiments of the present invention, the results of the query can include: a result node; an intermediary node between the result node and the first node for the first business; a first relationship between the first node and the intermediary node; or a second relationship between the intermediary node and the result node.

In some embodiments of the present invention, the collection of data can include: accounting data; financial data; social-network data; and personal information from a Personal Information Manager (PIM).

DETAILED DESCRIPTION

Figure 1:
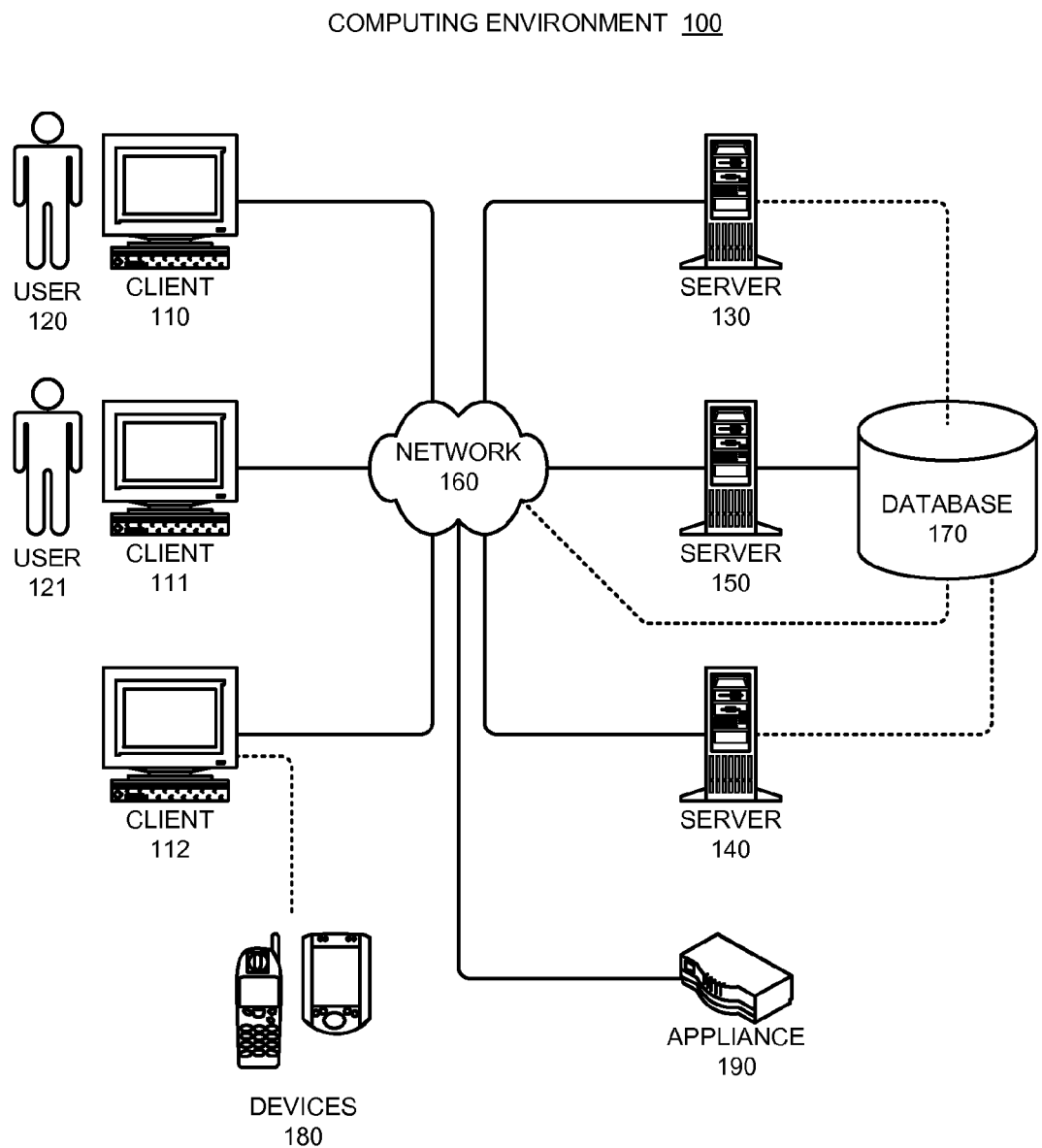
FIG. 1 illustrates a computing environment in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored on a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

Businesses often need to find and hire other businesses, such as plumbers, accountants and lawyers. Though directories are readily available, a social graph can help businesses discover trusted service providers by searching who their customers and vendors use. The social graph captures the relationships in a graph-based data model using standards-based Semantic Web technologies like Resource Description Framework (RDF); Resource Description Framework Schema (RDFS); Web Ontology Language (OWL); and Friend of a Friend (FOAF).

One embodiment of the present invention provides a system for building a small business social graph. During operation, the system receives a collection of data from a first business. Next, the system determines if a first node for the first business exists in a social graph, wherein the social graph is a graph-based data model that indicates relationships between various businesses. If not, the system adds the first node for the first business to the social graph. The system then analyzes the collection of data to identify a second business. Next, the system determines if a second node for the second business exists in the social graph. If not, the system adds the second node for the second business to the social graph. Finally, the system adds a relationship between the first node and the second node to the social graph to indicate the relationship between the first business and the second business.

Once the business data for a predetermined number of businesses has been analyzed and added to the social graph, the social graph can be used for various marketing and sales purposes. Note that the social graph has many other uses beyond marketing and sales; however, marketing and sales is discussed herein to provide a concrete set of examples of how the social graph can aid small businesses with future business decisions.

One advantage the social graph provides is the ability to query the social graph to determine common business connections. For example, consider the situation where a small law firm needs to hire a plumber to fix a clogged sink in the break room. Considering that the firm is not in the plumbing business and does not regularly interact with plumbers, the firm might have zero knowledge of local plumbers. In this situation, the firm queries the social graph to determine the local plumber with the highest number of business connections. Based on the assumption that people do not engage in repeat business with companies that provide bad service, the firm may query the social graph to determine the plumber with the highest number of business connections wherein the plumber has at least two transactions with each business connection.

In some embodiments of the present invention, adding a node to the social graph involves adding metadata describing the node to the social graph. For example, as the system creates a node in the social graph for the plumber, the system also tags the node with various metadata. This metadata can include tags that indicate general information, including the type of business, such as "plumber," as well as very specific information relating to specific transactions. Note that, in some embodiments of the present invention, both nodes and the connections between nodes include metadata.

In some embodiments of the present invention, adding a node to the social graph involves adding at least one unique identifier to the node. Note that besides a system-wide unique identifier, such as a globally unique identifier (GUID), other identifiers that are known to be unique may also be used. For example, in some embodiments of the present invention, the unique identifier may include at least one of a phone number, an email address, a street address, a contractor license number, a tax identification number, a Social Security number, or an account number.

In some embodiments of the present invention, the social graph adheres to at least one of a set of Semantic Web technologies. Note that while other technologies, such as traditional relational databases, may be used with embodiments of the present invention, the following descriptions discuss Semantic Web technologies. However, embodiments of the present invention are not meant to be limited to Semantic Web implementations.

In some embodiments of the present invention, the Semantic Web technologies can include: Resource Description Framework (RDF); Resource Description Framework Schema (RDFS); Web Ontology Language (OWL); and Friend of a Friend (FOAF). Note that, while these specific Semantic Web technologies are mentioned, any Semantic Web technology may be used by embodiments of the present invention.

In some embodiments of the present invention, the results of the query can include: a result node; an intermediary node between the result node and the first node for the first business; a first relationship between the first node and the intermediary node; or a second relationship between the intermediary node and the result node. For example, consider the situation where a hair salon owner queries the social graph for a particular product. In this example, the query may return the node for the manufacturer of the product, as well as intermediary nodes that represent the distributors of the product. Furthermore, the system may also show the relationships between the distributor nodes and the node for the salon, as well as relationships among the distributor nodes and nodes that represent competitors of the salon.

In some embodiments of the present invention, the collection of data can include: accounting data; financial data; social-network data; and personal information from a Personal Information Manager (PIM). For example, the system may leverage QuickBooks™ data and Outlook™ data when adding nodes for the business to the social graph. Note that various privacy laws and policies govern what information can be collected without consent, and what information can be collected with the consent of the business or other individuals or organizations affected by the collection of data. However, such collection policies are implementation details and are not discussed herein.

Computing Environment

FIG. 1 illustrates a computing environment 100 in accordance with an embodiment of the present invention. Computing environment 100 includes a number of computer systems, which can generally include any type of computer system based on a microprocessor, a mainframe computer, a digital signal processor, a portable computing device, a personal organizer, a device controller, or a computational engine within an appliance. More specifically, referring to FIG. 1, computing environment 100 includes clients 110-112, users 120 and 121, servers 130-150, network 160, database 170, devices 180, and appliance 190.

Clients 110-112 can include any node on a network including computational capability and including a mechanism for communicating across the network. Additionally, clients 110-112 may comprise a tier in an n-tier application architecture, wherein clients 110-112 perform as servers (servicing requests from lower tiers or users), and wherein clients 110-112 perform as clients (forwarding the requests to a higher tier).

Similarly, servers 130-150 can generally include any node on a network including a mechanism for servicing requests from a client for computational and/or data storage resources. Servers 130-150 can participate in an advanced computing cluster, or can act as stand-alone servers. In one embodiment of the present invention, server 140 is an online "hot spare" of server 150.

Users 120 and 121 can include: an individual; a group of individuals; an organization; a group of organizations; a computing system; a group of computing systems; or any other entity that can interact with computing environment 100.

Network 160 can include any type of wired or wireless communication channel capable of coupling together computing nodes. This includes, but is not limited to, a local area network, a wide area network, or a combination of networks. In one embodiment of the present invention, network 160 includes the Internet. In some embodiments of the present invention, network 160 includes phone and cellular phone networks.

Database 170 can include any type of system for storing data in non-volatile storage. This includes, but is not limited to, systems based upon magnetic, optical, or magneto-optical storage devices, as well as storage devices based on flash memory and/or battery-backed up memory. Note that database 170 can be coupled: to a server (such as server 150), to a client, or directly to a network.

Devices 180 can include any type of electronic device that can be coupled to a client, such as client 112. This includes, but is not limited to, cell phones, personal digital assistants (PDAs), smartphones, personal music players (such as MP3 players), gaming systems, digital cameras, video cameras, portable storage media, or any other device that can be coupled to the client. Note that, in some embodiments of the present invention, devices 180 can be coupled directly to network 160 and can function in the same manner as clients 110-112.

Appliance 190 can include any type of appliance that can be coupled to network 160. This includes, but is not limited to, routers, switches, load balancers, network accelerators, and specialty processors. Appliance 190 may act as a gateway, a proxy, or a translator between server 140 and network 160.

Note that different embodiments of the present invention may use different system configurations, and are not limited to the system configuration illustrated in computing environment 100. In general, any device that is capable of communicating via network 160 may incorporate elements of the present invention.

System

Figure 2:
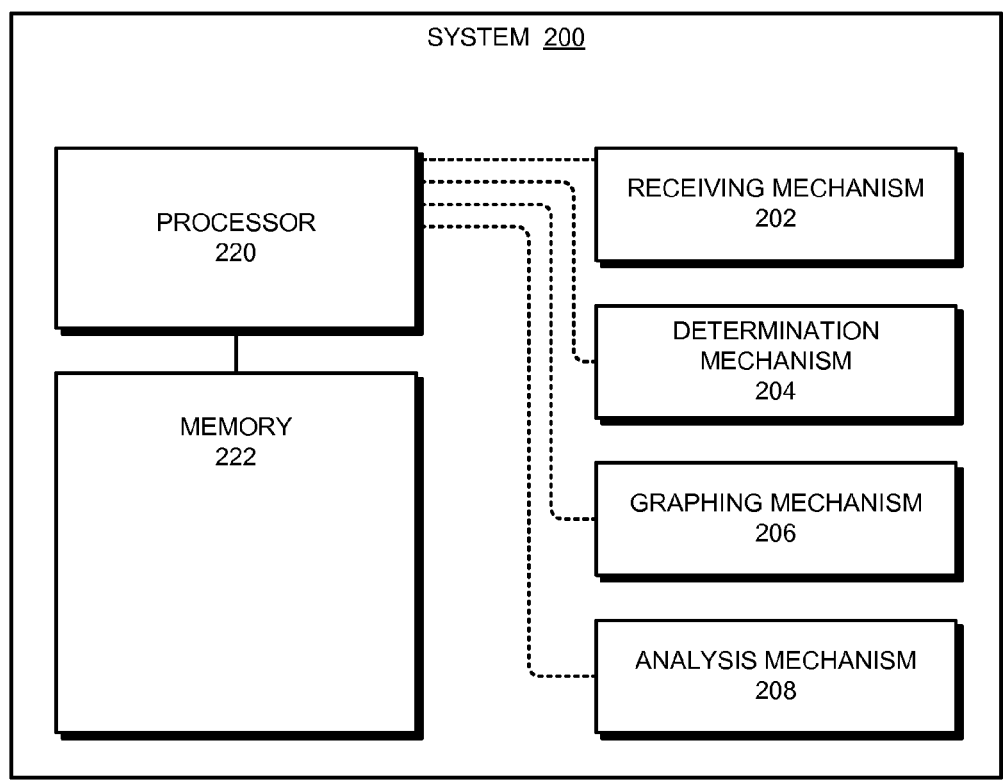
FIG. 2 illustrates a system in accordance with an embodiment of the present invention.

FIG. 2 illustrates a system 200 in accordance with an embodiment of the present invention. As illustrated in FIG. 2, system 200 can comprise server 150, database 170, appliance 190, client 110, devices 180, or any combination thereof. System 200 can also include receiving mechanism 202, determination mechanism 204, graphing mechanism 206, analysis mechanism 208, processor 220, and memory 222.

Creating a Social Graph

Figure 3:
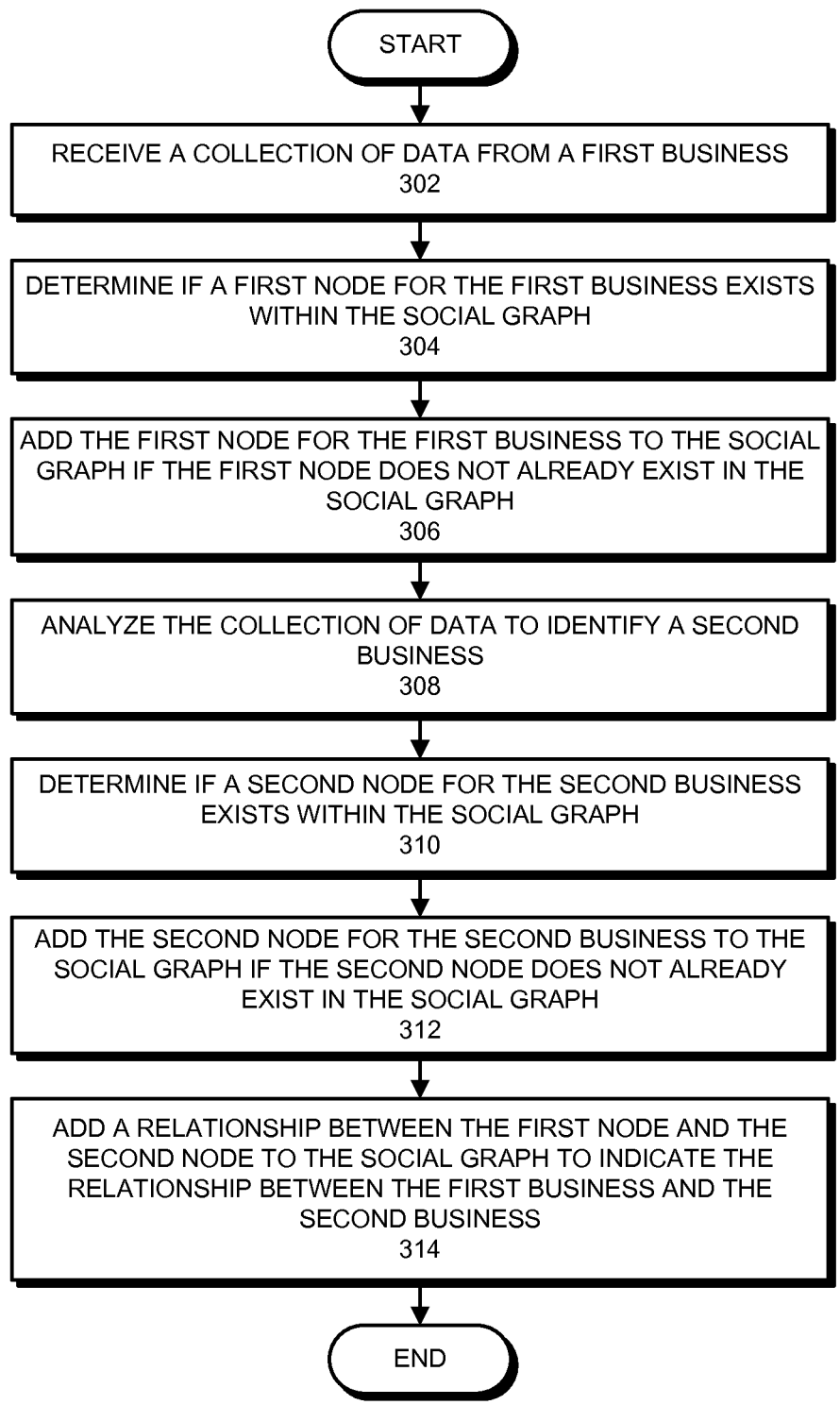
FIG. 3 presents a flow chart illustrating the process of creating a social graph in accordance with an embodiment of the present invention.

FIG. 3 presents a flow chart illustrating the process of creating a social graph in accordance with an embodiment of the present invention. During operation, receiving mechanism 202 receives a collection of data from a first business (operation 302). As described previously, this may involve receiving accounting data; financial data; social-network data; and personal information from a Personal Information Manager (PIM). Any electronic data that includes information about transactions and/or relationships with other businesses can be leveraged to create the social graph.

Next, determination mechanism 204 determines if a first node for the first business exists in a social graph (operation 304). Graphing mechanism 206 then adds the first node for the first business to the social graph if the first node does not already exist in the social graph (operation 306). In some embodiments of the present invention, if the first node already exists in the social graph, graphing mechanism 206 may merge the current information into the first node, replace the first node, or even create a second version of the first node and flag it for review, depending on the configuration criteria.

In some embodiments of the present invention, graphing mechanism 206 adds metadata to the first node that helps describe the first node. Note that this metadata originates in the collection of data received from the business. This can include anything from very basic descriptive data, such as the business type, to more complex data representing information about specific business transactions.

Once the first node has been added, analysis mechanism 208 analyzes the collection of data to identify a second business (operation 308). Upon identifying the second business, determination mechanism 204 determines if a second node for the second business exists in the social graph (operation 310). Graphing mechanism 206 then adds the second node for the second business to the social graph if the second node does not already exist in the social graph (operation 312).

As with operation 306, if the second node already exists in the social graph, graphing mechanism 206 may merge the current information into the second node, replace the second node, or even create a second version of the second node and flag it for review, depending on the configuration criteria. Note that graphing mechanism 206 may also add metadata to the social graph describing the second node.

Finally, graphing mechanism 206 adds a relationship between the first node and the second node to the social graph to indicate the relationship between the first business and the second business (operation 314). Furthermore, graphing mechanism 206 may also add metadata to the social graph describing the relationship between the first business and the second business by attaching the metadata to the relationship between the first node and the second node.

Exemplary Embodiment

In one embodiment of the present invention, for each company that exists in a collection of business data, an RDF representation is generated and added to the social graph. In this embodiment, an ontology has been defined for small businesses which is based on the semantic web standard called FOAF (Friend Of a Friend). Every company is represented as an FOAF organization, and the owner of each business is represented as an FOAF person.

Furthermore, each customer and vendor is also represented within the social graph in the same way. Customers who are individual consumers, but not businesses, are represented only as FOAF persons without an associated organization. Identifiers like phone numbers and email addresses are represented as uniform resource identifiers (URIs) and are nodes in the RDF graph. RDFs from multiple companies are constantly merged into the social graph as the data is received.

In a typical use case, consider the following scenario: Daniel Green is the owner of "Green Garden" and uses online accounting software for his business accounting. The phone number for Green Garden is 408-555-9876. Green Garden has a vendor called "Landscapers" who supplies garden supplies to Green Garden. The owner of Landscapers is Tom Hunt, and their phone number is 408-555-5368. Assume that Landscapers is also using the same online accounting software.

In this scenario, the first step is to analyze the online accounting data to generate the RDF for Green Garden. This RDF corresponds to an instance of FOAF:Document. The system then presents Daniel Green as an FOAF:Person. In addition, the system represents the telephone of Green Garden in the social graph using the FOAF:Phone property. In this embodiment, the phone number is represented as a URI and stored along with the property.

Once the social graph has been populated with the information for Green Garden, the system uses the FOAF:Knows property and connects the FOAF:Person corresponding to Tom Hunt. Note that this represents the fact that Daniel Green knows Tom Hunt. The system then represents the phone number for Tom Hunt using the FOAF:Phone property.

Next, the RDF representation for Landscapers is created. While modeling Landscapers as an FOAF:Organization and Tom Hunt as an FOAF:Person, the phone number which is modeled as a URI matches the one that is already stored in the RDF corresponding to Green Garden. Note that in this embodiment the system considers the phone number as the only identifier, but other embodiments can have any number of identifiers. When such a match is detected, the two entries that contain the same phone identifiers are related with OWL:SameAs. This means they represent the same entity and, thus, are semantically equivalent.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for building a small business social graph, the method comprising:
   receiving, by computer, a collection of data from a first business; and
   building, by computer, a social graph that adheres to a Resource Description Framework Schema (RDFS) by:
      determining an ontology for businesses in the social graph;
      determining if a first node for the first business exists in the social graph, wherein the social graph is a graph-based data model that indicates relationships among various businesses;
      if not, adding the first node for the first business to the social graph according to the ontology;
      analyzing the collection of data to identify a second business;
      determining if a second node for the second business exists in the social graph;
      if not, adding the second node for the second business to the social graph according to the ontology;
      adding a relationship between the first node and the second node to the social graph, according to the ontology, to indicate the relationship between the first business and the second business;
   analyzing the collection of data to identify a first person;
   determining if a third node for the first person exists in the social graph;
   if not, adding the third node for the first person to the social graph according to the ontology;
   determining that the second node and the third node share a unique identifier; and
   relating the second business and the first person as a same entity.

2. The computer-implemented method of claim 1, wherein adding a node to the social graph involves adding metadata describing the node to the social graph.

3. The computer-implemented method of claim 1, wherein adding a node to the social graph involves adding at least one unique identifier to the node.

4. The computer-implemented method of claim 3, wherein the unique identifier may include at least one of:
   a phone number;
   an email address;
   a street address;
   a contractor license number;
   a tax identification number;
   a Social Security number; and
   an account number.

5. The computer-implemented method of claim 1, further comprising:
   receiving a request to query the social graph from the first business, wherein the query includes an item of metadata;
   in response to the request, querying the social graph with the item of metadata; and
   returning the results of the query to the first business.

6. The computer-implemented method of claim 5, wherein the results of the query can include:
   a result node;
   an intermediary node between the result node and the first node for the first business;
   a first relationship between the first node and the intermediary node; and
   a second relationship between the intermediary node and the result node.

7. The computer-implemented method of claim 1, wherein the collection of data can include:
   accounting data;
   financial data;
   social-network data; and
   personal information from a Personal Information Manager (PIM).

8. A non-transitory computer-readable storage medium storing instructions that when executed by a computer cause the computer to perform a method for building a small business social graph, the method comprising:
   receiving a collection of data from a first business; and
   building a social graph that adheres to a Resource Description Framework Schema (RDFS) by:
      determining an ontology for businesses in the social graph;
      determining if a first node for the first business exists in the social graph, wherein the social graph is a graph-based data model that indicates relationships among various businesses;
      if not, adding the first node for the first business to the social graph according to the ontology;
      analyzing the collection of data to identify a second business;
      determining if a second node for the second business exists in the social graph;
      if not, adding the second node for the second business to the social graph according to the ontology;
      adding a relationship between the first node and the second node to the social graph, according to the ontology, to indicate the relationship between the first business and the second business,
   analyzing the collection of data to identify a first person;
   determining if a third node for the first person exists in the social graph;

if not, adding the third node for the first person to the social graph according to the ontology;

determining that the second node and the third node share a unique identifier; and relating the second business and the first person as a same entity.

9. The non-transitory computer-readable storage medium of claim 8, wherein adding a node to the social graph involves adding metadata describing the node to the social graph.

10. The non-transitory computer-readable storage medium of claim 8, wherein adding a node to the social graph involves adding at least one unique identifier to the node.

11. The non-transitory computer-readable storage medium of claim 6, wherein the unique identifier may include at least one of:
   a phone number;
   an email address;
   a street address;
   a contractor license number;
   a tax identification number;
   a Social Security number; and
   an account number.

12. The non-transitory computer-readable storage medium of claim 8, wherein the method further comprises:
   receiving a request to query the social graph from the first business, wherein the query includes an item of metadata;
   in response to the request, querying the social graph with the item of metadata; and
   returning the results of the query to the first business.

13. The non-transitory computer-readable storage medium of claim 12, wherein the results of the query can include:
   a result node;
   an intermediary node between the result node and the first node for the first business;
   a first relationship between the first node and the intermediary node; and
   a second relationship between the intermediary node and the result node.

14. The non-transitory computer-readable storage medium of claim 8, wherein the collection of data can include:
   accounting data;
   financial data;
   social-network data; and
   personal information from a Personal Information Manager (PIM).

15. An apparatus configured for building a small business social graph, comprising:
   a memory;
   a processor;
   a receiving mechanism configured to receive a collection of data from a first business;
   a graphing mechanism configured to build a social graph that adheres to a Resource Description Framework Schema (RDFS);
   a determination mechanism configured to determine an ontology for businesses in the social graph
   wherein the determination mechanism is further configured to determine if a first node for the first business exists in the social graph, wherein the social graph is a graph-based data model that indicates relationships among various businesses;
   wherein the graphing mechanism is further configured to add the first node for the first business to the social graph according to the ontology if the first node does not already exist in the social graph;
   an analysis mechanism configured to analyze the collection of data to identify a second business;
   wherein the determination mechanism is further configured to determine if a second node for the second business exists in the social graph;
   wherein the graphing mechanism is further configured to add the second node for the second business to the social graph according to the ontology if the second node does not already exist in the social graph;
   wherein the graphing mechanism is further configured to add a relationship between the first node and the second node to the social graph, according to the ontology, to indicate the relationship between the first business and the second business;
   wherein the analysis mechanism is further configured to analyze the collection of data to identify a first person;
   wherein the determination mechanism is further configured to determine if a third node for the first person exists in the social graph;
   wherein the graphing mechanism is further configured to add the third node for the first person to the social graph according to the ontology if the third node does not exist;
   wherein the determination mechanism is further configured to determine that the second node and the third node share a unique identifier; and
   wherein the graphing mechanism is further configured to relate the second business and the first person as a same entity.

16. The apparatus of claim 15, wherein the graphing mechanism adds metadata describing the node to the social graph when adding the node to the social graph.

* * * * *